(12) United States Patent
Sikkink et al.

(10) Patent No.: US 10,152,284 B2
(45) Date of Patent: Dec. 11, 2018

(54) SYNCHRONIZING METADATA WITH ALTERATIONS TO A PORTABLE DOCUMENT FORMAT PRINT JOB

(71) Applicants: Jeffrey Alan Sikkink, Longmont, CO (US); Marquis G. Waller, Beverly, OH (US); Michael Glen Lotz, Longmont, CO (US)

(72) Inventors: Jeffrey Alan Sikkink, Longmont, CO (US); Marquis G. Waller, Beverly, OH (US); Michael Glen Lotz, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 100 days.

(21) Appl. No.: 15/334,889

(22) Filed: Oct. 26, 2016

(65) Prior Publication Data

US 2018/0113658 A1 Apr. 26, 2018

(51) Int. Cl.
*G06F 3/12* (2006.01)

(52) U.S. Cl.
CPC .......... *G06F 3/1248* (2013.01); *G06F 3/1204* (2013.01); *G06F 3/1206* (2013.01); *G06F 3/1263* (2013.01); *G06F 3/1288* (2013.01); *G06F 3/1293* (2013.01)

(58) Field of Classification Search
None
See application file for complete search history.

(56) References Cited

U.S. PATENT DOCUMENTS

| | | | |
|---|---|---|---|
| 5,923,013 A | 7/1999 | Suzuki et al. |
| 7,184,157 B2 | 2/2007 | Dennison et al. |
| 7,375,842 B2 | 5/2008 | Kloosterman et al. |
| 7,710,590 B2 | 5/2010 | Beus et al. |
| 7,864,351 B2 | 1/2011 | Honma |
| 8,059,290 B2 | 11/2011 | Kuroshima |
| 8,164,782 B2 | 4/2012 | Ocke et al. |
| 8,219,526 B2 | 7/2012 | Clarke et al. |
| 8,320,008 B2 | 11/2012 | Jahn |
| 8,325,371 B2 | 12/2012 | Oshima |
| 8,400,663 B2 | 3/2013 | Wang |
| 8,559,047 B2 | 10/2013 | Naka et al. |

(Continued)

OTHER PUBLICATIONS

Dr. Rainer Prosi; Metadata in PDF/VT; https://confluence.cip4.org/display/PUB/ICS-CommonMetadata.PDF.1.5.

(Continued)

*Primary Examiner* — Andrew H Lam
(74) *Attorney, Agent, or Firm* — Duft & Bornsen, PC

(57) ABSTRACT

Systems and methods for synchronizing metadata with alterations to a PDF print job. One embodiment includes a system that includes a print server with an interface and memory. The interface receives a Portable Document Format (PDF) print job associated with a metadata file that defines contextual information for the PDF print job, and the memory stores an action list that defines a sequence of steps for modifying the PDF print job. The print server also includes a job controller that, for the sequence, iteratively detects a step that performs a change to printable content in the PDF print job, identifies a parameter field in the metadata file that relates to the printable content, and modifies the parameter field in the metadata file based on the change to the printable content in the PDF print job.

20 Claims, 4 Drawing Sheets

(56) References Cited

U.S. PATENT DOCUMENTS

| | | |
|---|---|---|
| 8,560,945 B2 | 10/2013 | Akiyama et al. |
| 8,572,030 B2 | 10/2013 | Clarke et al. |
| 8,736,873 B2 | 5/2014 | Ito |
| 8,767,230 B2 | 7/2014 | Otomaru et al. |
| 8,902,456 B2 | 12/2014 | Robinson |
| 8,988,692 B2 | 3/2015 | Myoki |
| 9,064,201 B2 | 6/2015 | Ito |
| 9,311,575 B2 | 4/2016 | Sochi et al. |
| 9,336,467 B2 | 5/2016 | Tokushima et al. |
| 2003/0189726 A1 | 10/2003 | Kloosterman et al. |
| 2012/0019856 A1 | 1/2012 | Oshima |
| 2012/0081746 A1 | 4/2012 | Yamaguchi |
| 2013/0016389 A1* | 1/2013 | Robinson ............... G06F 3/1206 358/1.15 |
| 2013/0155436 A1* | 6/2013 | Gaertner ............... G06F 3/1208 358/1.13 |
| 2014/0368876 A1 | 12/2014 | Kuranoshita |
| 2015/0235111 A1 | 8/2015 | Hosomi et al. |
| 2015/0244890 A1 | 8/2015 | Ciocarlie et al. |

OTHER PUBLICATIONS ip.com; System to enable JDF driven PDT/VT media and finishing requirements to be met before job released for print; Electronic Publication Date: Sep. 24, 2013.
Jason Lisi; PDF/VT: Overview and Practice; info©gwg.org: Ghent Workgroup: Mar. 4, 2014.
Technical Paper; Reliable JDF Job Ticketing with Adobe Creative Suite using Acrobat 9 Pro: 2008 Adobe Systems Incorporated.
Xerox FreeFlow Print Server What's New: FreeFlow Print Server V9 SP3; May 2013 702P01397; Xerox Corporation.

* cited by examiner

SYNCHRONIZING METADATA WITH ALTERATIONS TO A PORTABLE DOCUMENT FORMAT PRINT JOB

FIELD OF THE INVENTION

The invention relates to the field of printing, and in particular, to Portable Document Format (PDF) print jobs.

BACKGROUND

Portable Document Format (PDF) is a file format used to exchange documents across many different computer platforms. A PDF file is self-contained, which means that the text, graphics, fonts, and other features are all included within the PDF file. As such, the printable content of a PDF file may be altered by an application configured to perform automatic changes to the PDF file, which is particularly useful for large PDF files that undergo repetitive editing tasks.

In the context of a print shop environment, a PDF file may be used as a print job with hundreds or thousands of documents to print, organize, and mail to customers. A PDF print job for a print shop may be accompanied with a separate metadata file (e.g., job ticket) that describes contextual information for processing the PDF print job. However, the PDF print job may be incorrectly processed and printed in the print shop if the metadata is out-of-sync with the PDF file. Thus, for a PDF print job subject to automated alterations in a print shop, the operator must track the numerous changes to the PDF file and make appropriate manual edits to its associated metadata. This task is tedious, time-consuming, and prone to introducing errors in the processing, printing, and handling of the PDF print job at the print shop.

SUMMARY

Embodiments described herein provide synchronizing metadata with alterations to a PDF print job. A print server of a print shop performs autonomous edits to a metadata file as its corresponding PDF print job undergoes a predefined routine of modifications. Because synchronization between the PDF print job and its metadata is constantly maintained, the risk of processing errors resulting from modifying the print job is substantially reduced or eliminated.

One embodiment is a system that includes a print server with an interface and memory. The interface receives a Portable Document Format (PDF) print job associated with a metadata file that defines contextual information for the PDF print job, and the memory stores an action list that defines a sequence of steps for modifying the PDF print job. The print server also includes a job controller that, for the sequence, iteratively detects a step that performs a change to printable content in the PDF print job, identifies a parameter field in the metadata file that relates to the printable content, and modifies the parameter field in the metadata file based on the change to the printable content in the PDF print job.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
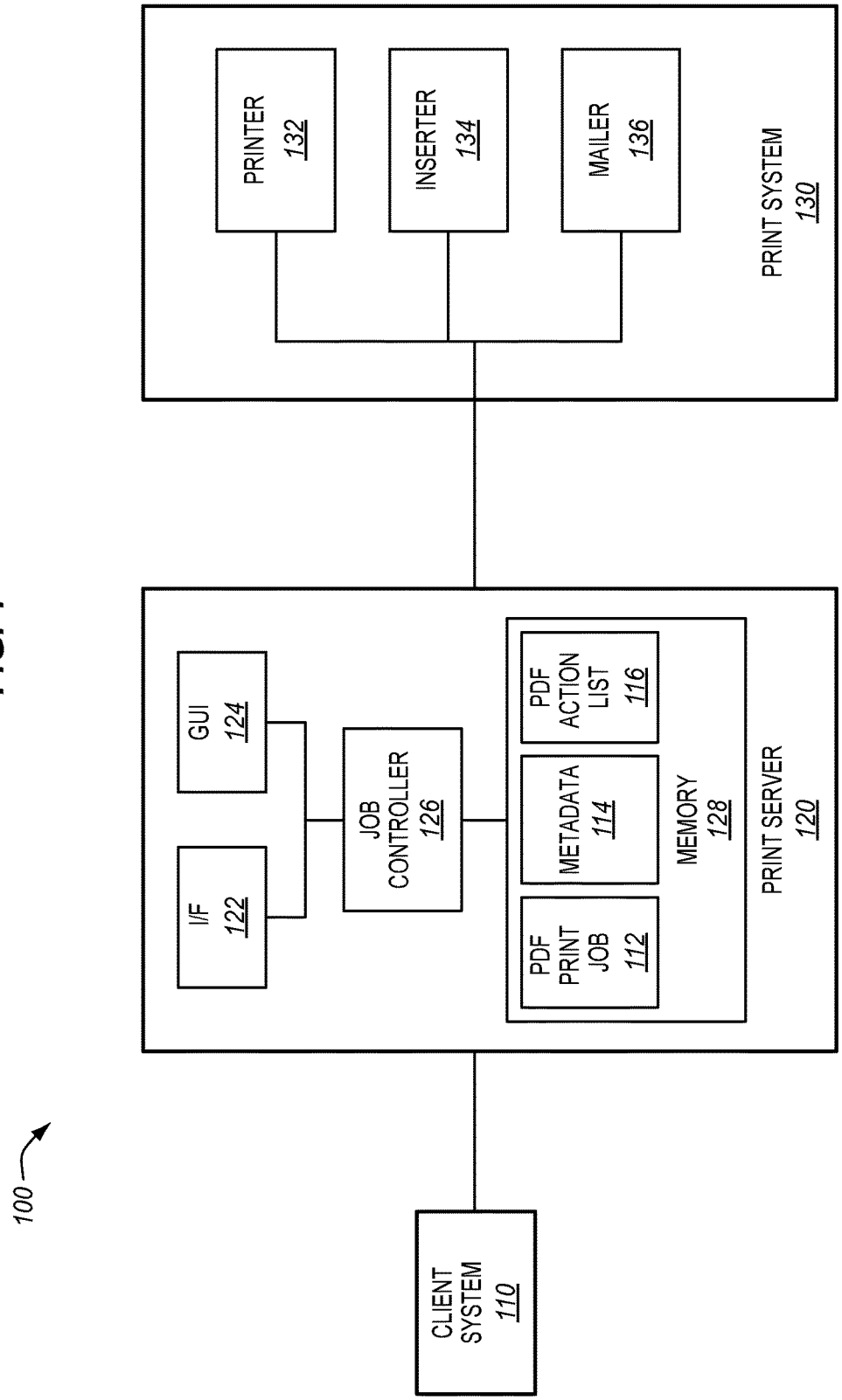
FIG. 1 is a block diagram of a print shop architecture in an exemplary embodiment.

FIG. 1 is a block diagram of a print shop architecture 100 in an exemplary embodiment. Print shop architecture 100 may include one or more client system(s) 110, print server(s) 120, and print system(s) 130 that interact to carry out any number of high-volume printing applications, such as mass-mail printing of time sensitive statements and bills. In general, a client system 110 generates and submits files of print data formatted in Portable Document Format (PDF) to a print server 120 configured to prepare PDF print jobs 112 for a print system 130 under its control. In the course of carrying out job processing tasks, the print server 120 may reference one or more metadata file(s) 114 that describe contextual information for a PDF print job 112. A finalized PDF print job 112 may then be scheduled with one or more devices of the print system 130, examples of which include one or more printer(s) 132 to physically mark a web of print media, inserter(s) 134 to insert cut pages into envelopes, mailer(s) 136 to deliver mail to recipients, and/or other print-related devices, post-print machinery, e-mail or web publishing servers, etc.

An operator of print server 120 may wish to change the printable content of a PDF print job 112 before printing or further print workflow processing. To avoid reiterative manual edits to a large PDF file, an operator may implement a PDF action list 116 capable of automating the editing processes at print server 120 with previously-defined instructions. Suppose, for example, that a PDF job containing thousands of customer credit card statements is to be modified by: (1) relocating text for a specific media type dispersed throughout the PDF, and (2) inserting a print object on the first page of a statement for each account holder with a specific zip code. To accomplish this task, the operator may configure a PDF action list 116 capable of directing a specific change or series of changes to alter the printed appearance of a PDF print job 112 from its original version. The PDF action list 116 may be executed to perform any desired combination of PDF alterations without user intervention.

However, the metadata file 114 may become incompatible with its corresponding PDF print job 112 as the changes directed by the PDF action list 116 are executed. Since the printable content of the PDF print job 112 is self-contained, a change made to the printable content may cause a shift within the PDF file such that the identifiers in the metadata file 114 refer to an unintended segment of the PDF print job 112. Operators of previous print shops must therefore manually track the potentially numerous changes to the PDF file and make manual edits to the metadata file so that the files remain synchronized. Failure to update the metadata of the PDF file or mistakes in the manual editing process may result in downstream errors in the processing, printing, and handling of the print job.

The print server 120 is therefore enhanced with a job controller 126 configured to detect a modification to PDF print job 112 and update the metadata file 114 accordingly. More particularly, the job controller 126 may be configured to synchronize a metadata file 114 with the changes to the PDF print job 112 as directed by the PDF action list 116. This ensures synchronization between PDF print job 112 and metadata 114 for efficient, error-free processing of PDF print job 112 while avoiding the risks associated with relying on manual edits to a metadata file 114.

Print server 120 may further include an interface 122 (e.g., an Ethernet interface, wireless interface, etc.) operable to communicate with devices and systems over a network, such as client system 110 and print system 130, and a graphical user interface (GUI) 124 operable to receive input from a user, such as a local administrator of the print server 120. Print server 120 may further include memory 128 (e.g., Random Access Memory (RAM), a hard disk, etc.) for storing a PDF print job 112, its associated metadata file 114, and/or a PDF action list(s) 116 for modifying the PDF print job 112. Job controller 126 may be implemented as custom circuitry, as a processor executing programmed instructions, etc. The particular arrangement, number, and configuration of components discussed herein are exemplary. Additional details of operation are discussed below.

Figure 2:
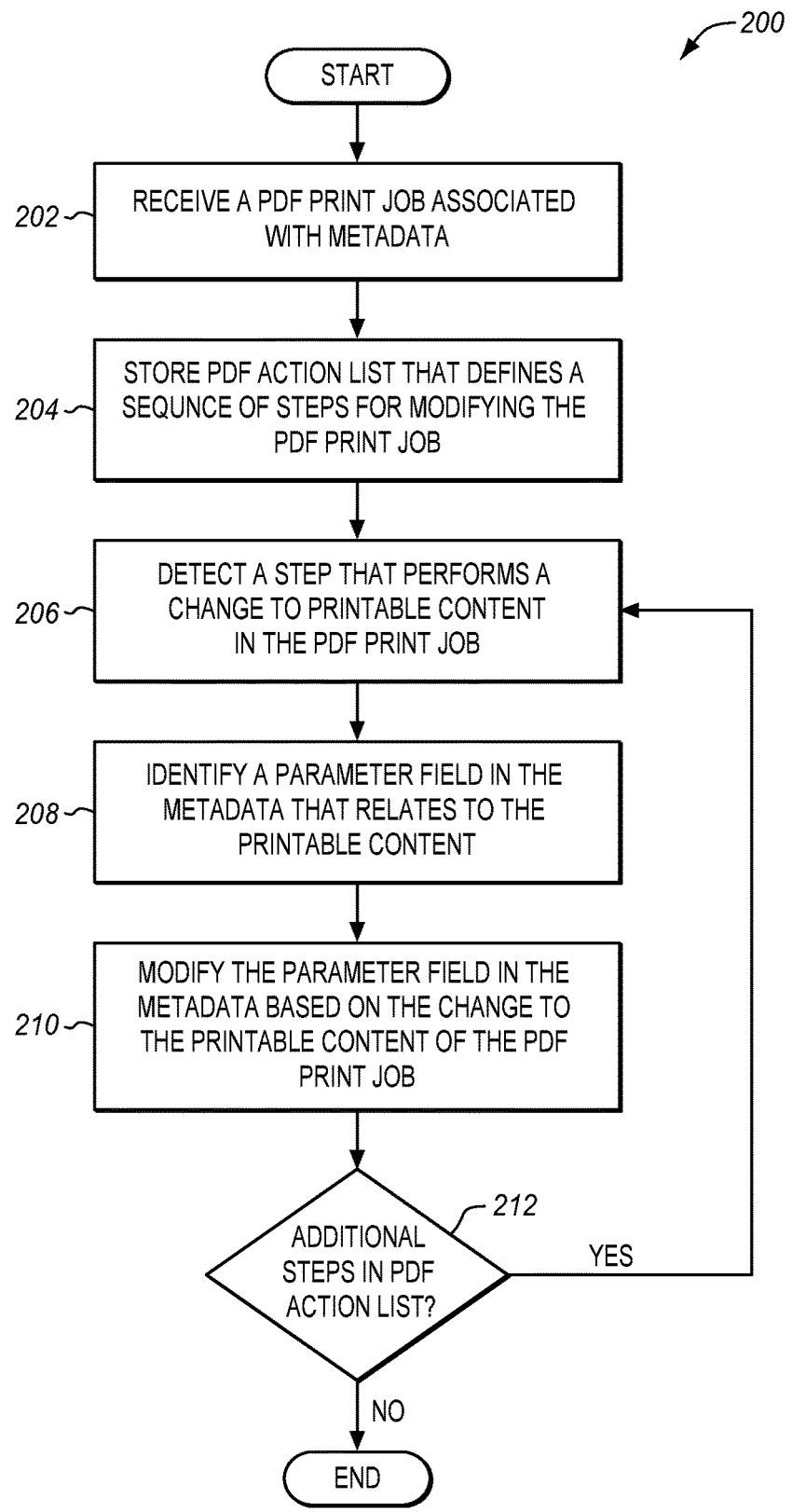
FIG. 2 is a flowchart illustrating a method for synchronizing metadata with alterations to a PDF print job in an exemplary embodiment.

FIG. 2 is a flowchart illustrating a method 200 for synchronizing a metadata 114 with alterations to PDF print job 112 in an exemplary embodiment. The steps of method 200 are described with reference to the print shop architecture 100 of FIG. 1, but those skilled in the art will appreciate that method 200 may be performed in other systems. The steps of the flowcharts described herein are not all inclusive, may include other steps not shown, and may be performed in an alternative order.

In step 202, interface 122 of print server 120 receives PDF print job 112 and associated metadata 114. Job controller 126 may correlate PDF print job 112 and metadata 114 based on filename(s), folder location(s), the submitting user or client system 110, etc. Alternatively or additionally, job controller 126 may associate PDF print job 112 with metadata file 114 received from a separate source, such as from an administrator of GUI 124, a database/server external to print server 120, etc. The metadata file 114 may include descriptive metadata and/or operational metadata in any suitable format, such as in the form of a Job Definition Format (JDF) job ticket, .csv extension file, etc. In general, descriptive metadata indicates properties of a document (e.g., a customer account, a document type, a media value, etc.) in the PDF print job 112 and/or properties of the PDF print job 112 itself (e.g., duplex, media type, stapling, etc.), and operational metadata indicates commands for the print server 120 and/or print system 130 to follow for handling the PDF print job 112, such as a preferred rasterization algorithm or finishing instructions.

In step 204, memory 128 of print server 120 stores a PDF action list 116 that defines a sequence of steps for modifying PDF print job 112. When the PDF action list 116 is executed, job controller 126 may perform the series of modifications to PDF print job 112 according to the order and criteria of the steps defined in the PDF action list 116. Each step in the PDF action list 116 may include instructions that direct one or more modifications to the handling or appearance of a segment PDF print job 112. Exemplary modifications include insertion, deletion, rotation, relocation, etc., and exemplary segments of PDF print job 112 include individual pages, range of pages, printable objects/text within a page, printable content from another PDF file or external source, etc. A local operator or an appropriately authorized user of print server 120 may configure the order, criteria, and instructions of the steps in the PDF action list 116 and store the configuration in memory 128. Job controller 126 may assign a PDF print job 112 to a PDF action list 116 based on operator input at GUI 124, filename(s), folder location(s), a user or client system 110, etc. Job controller 126 may also initiate execution of a PDF action list 116 in response to user input and/or detecting the presence of suitable files at appropriate file locations.

In step 206, job controller 126 detects a step that performs a change to printable content in PDF print job 112. After initializing execution of PDF action list 116, job controller 126 may begin analyzing the steps in sequence to identify alterations to specified segments of PDF print job 112. Job controller 126 may detect an alteration of a step that is to be executed, concurrently with execution of a step, or in response to an executed step. Thus, job controller 126 may anticipate changes to be made to a PDF print job 112 by an executed PDF action list 116 and/or detect changes to PDF print job 112 simultaneously or near simultaneously with the execution of a step in PDF action list 116.

In step 208, job controller 126 identifies a parameter field in the metadata file 114 that relates to the printable content subject to change. Job controller 126 may refer to the criteria and/or instruction of a step in PDF action list 116 to identify the segments of printable content in the PDF print job 112 subject to change as detected in step 206. A segment of print data in the PDF print job 112 may be indicated, for example, by a border, break, page number, object ID, or tag that identifies/distinguishes printable content in a PDF print job 112. Alternatively or additionally, segments of print data may be defined in a metadata file 114. Job controller 126 may therefore identify boundaries between PDF page groups (e.g., mail pieces, billing statements for different customers, etc. as defined in a file/job ticket accompanying the PDF print job) in the original PDF print job. Job controller 126 may locate the relevant parameter field of the metadata file 114 based on a correlation (e.g., text match, tag match, lookup table, etc.) between the contents of the metadata file 114 and the identified PDF segment.

In one embodiment, job controller 126 is configured to determine whether a modification to the PDF print job 112 impacts the contents of the metadata file 114. Thus, job controller 126 may analyze the metadata file 114 to determine whether the particular action(s) and/or PDF content referenced in the step are directly or indirectly relevant to the content of the metadata file 114. To illustrate in a simplified example, an action that removes page 1 of a PDF may shift the printable content and reverberate to indirectly impact other segment(s) of the PDF print job 112 such that a reference to page 3 in the metadata file 114 is indirectly impacted. When a direct or indirect relevancy is detected, job controller 126 may proceed to step 210. Otherwise, job controller 126 may skip step 210 and proceed to step 212.

In step 210, job controller 126 modifies the parameter field in the metadata file 114 based on the change to the printable content of PDF print job 112. That is, job controller 126 may replace text in the identified parameter field of the metadata file 114 with the correlated description of the PDF segment changed by the step of the PDF action list 116. Job controller 126 may perform the edit to the content of the metadata file based on its analysis of the instruction(s) of the step in PDF action list 116 without any user intervention. Job controller 126 may alter the metadata file 114 in response to detecting a change to the PDF print job 112 and/or may perform the alterations of the metadata file 114 and the PDF print job 112 concurrently or substantially concurrently.

In one embodiment, job controller 126 is configured to modify the parameter field in the metadata file before execution of a subsequent step in the sequence. That is, for each step in the PDF action list 116, job controller 126 may alter the PDF print job 112 and the metadata file 114 before performing any action defined by a subsequent step in the PDF action list 116. This ensures that synchronization between the PDF print job 112 and the metadata file 114 is maintained during execution of PDF action list 116 so as not to risk a subsequent step changing a PDF segment based on incongruous metadata. In another embodiment, job controller 126 is configured to open both the PDF print job 112 and the metadata file 114 for an executing PDF action list 116, and to modify both the PDF and metadata together at each step, following the sequence of steps as defined in the PDF action list 116 to the last step of PDF action list 116 where the PDF print job 112 may be closed, so that synchronization is ensured with a single opening/closing of the PDF print job 112.

In step 212, job controller 126 determines if there are additional steps in the PDF action list 116. If so, job controller 126 may iteratively repeat steps 206, 208, and 210 for the next step in the PDF action list 116. Otherwise, job controller 126 may end the synchronization process and provide the finalized PDF print job 112 and metadata file 114 for subsequent processing in the print workflow of print server 120 and/or printing/handling in the print system 130.

Using method 200, the metadata file 114 is autonomously adapted with its PDF print job 112 despite potentially numerous rapid changes to the PDF print job 112 at the print server 120. The metadata file 114 and PDF print job 112 may maintain constant synchronization to allow for significant changes to be made to the PDF print job 112 at the print server 120 before printing while also eliminating the risk of introducing downstream processing errors as a result of those changes and increasing overall throughput at a print shop.

Figure 3:
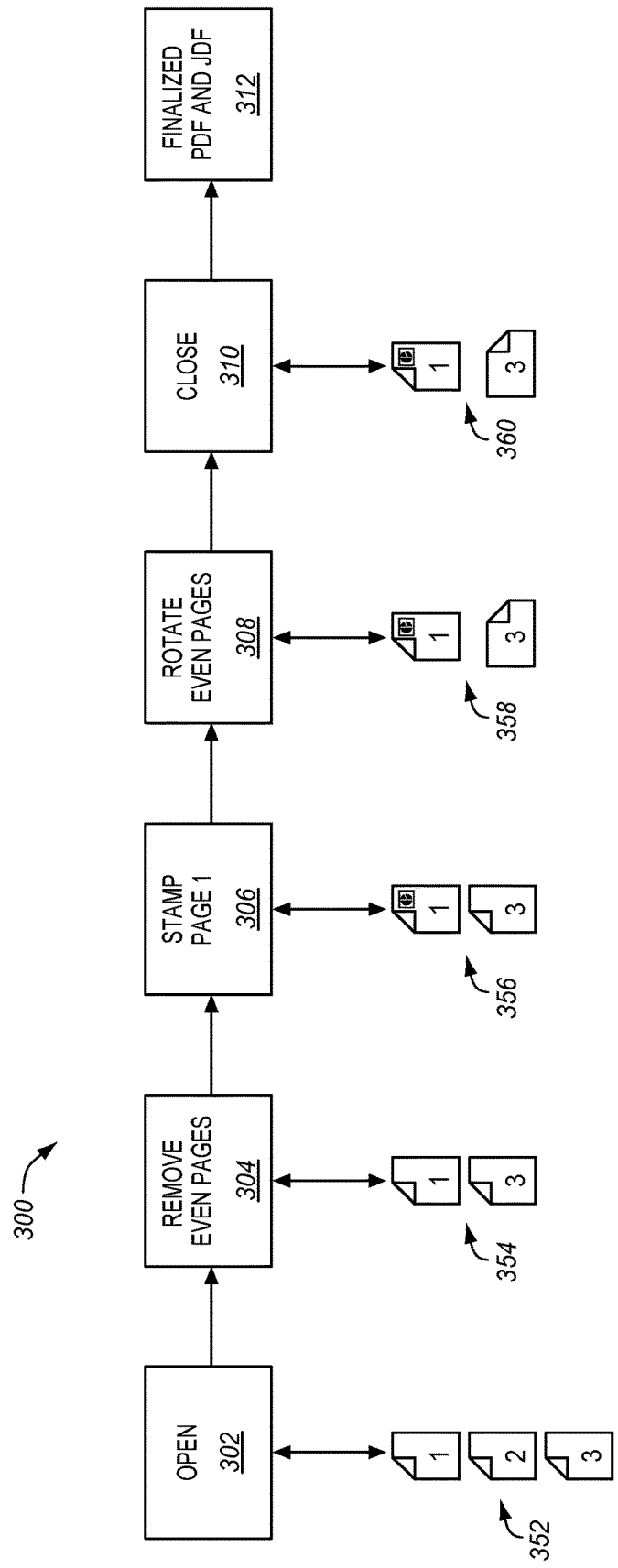
FIG. 3 illustrates a PDF print job modified by a PDF action list in an exemplary embodiment.

FIG. 3 illustrates a PDF print job modified by a PDF action list 300 in an exemplary embodiment. In this simplified example, the PDF action list 300 alters a PDF print job 352 originally including three logical pages with a series of steps 302-312 configurable by a user of print server 120. The user may link the steps together in any number of configurations using GUI 124. Additionally, each step 302-312 of the action list 300 may be linked with a control file with instructions, fields, values, etc., which may be edited by the user for the desired configuration of PDF action list 300.

Upon execution of PDF action list 300, step 302 instructs the job controller to open the PDF print job 352 and its associated metadata file (not shown) from the appropriate file locations. With both files open, step 304 instructs the job controller to remove the even pages, resulting in a change in appearance of the print job as shown in element 354. In response to this change in the PDF, the job controller updates the metadata to indicate that page 2 has been removed.

Next, step 306 instructs the job controller to stamp page 1 resulting in the change in appearance in the job as shown in element 356 and the appropriate corresponding updates to metadata. Then, step 308 instructs the job controller to rotate the even pages of the print job. Since the job controller has maintained synchronization between the metadata and PDF leading up to this change, the job controller can determine that the metadata relating to page 3 is impacted by the instruction in step 308 to rotate the event pages of the PDF print job. Thus, the job controller may update the parameter fields related to page 3 to reflect the original intent of the metadata despite ensuing changes to the PDF. This ensures correct synchronization when the PDF and metadata files are closed in step 310, and finalized in step 312 so that print workflow may operate on the finalized PDF with the correct metadata.

Figure 4:
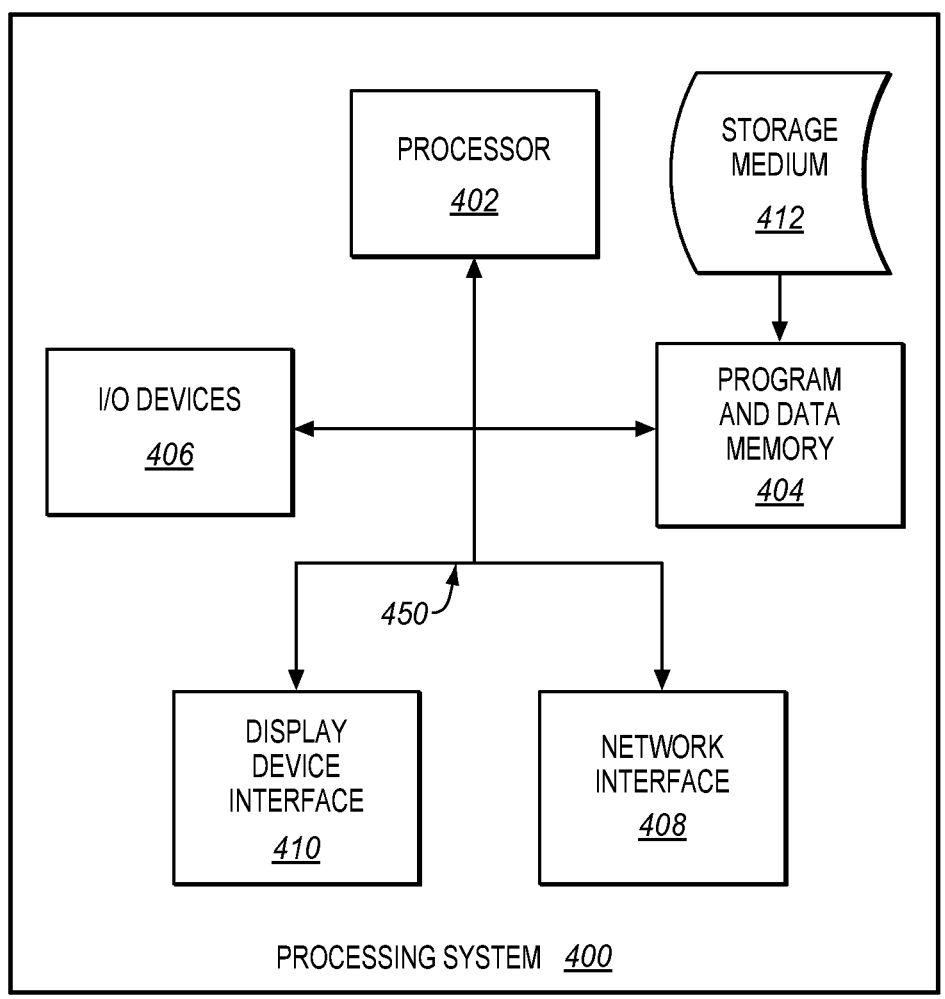
FIG. 4 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of print server 120 to perform the various operations disclosed herein. FIG. 4 illustrates a processing system 400 operable to execute a computer readable medium embodying programmed instructions to perform desired functions in an exemplary embodiment. Processing system 400 is operable to perform the above operations by executing programmed instructions tangibly embodied on computer readable storage medium 412. In this regard, embodiments of the invention can take the form of a computer program accessible via computer-readable medium 412 providing program code for use by a computer or any other instruction execution system. For the purposes of this description, computer readable storage medium 412 can be anything that can contain or store the program for use by the computer.

Computer readable storage medium 412 can be an electronic, magnetic, optical, electromagnetic, infrared, or semiconductor device. Examples of computer readable storage medium 412 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 400, being suitable for storing and/or executing the program code, includes at least one processor 402 coupled to program and data memory 404 through a system bus 450. Program and data memory 404 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 406 (including but not limited to keyboards, displays, pointing devices, etc.) can be coupled either directly or through intervening I/O controllers. Network adapter interfaces 408 may also be integrated with the system to enable processing system 400 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 410 may be integrated with the system to interface to one or more display devices, such as printing systems and screens for presentation of data generated by processor 402.

Although specific embodiments were described herein, the scope of the invention is not limited to those specific embodiments. The scope of the invention is defined by the following claims and any equivalents thereof.

What is claimed is:

1. A system comprising:
a print server comprising:
an interface configured to receive a Portable Document Format (PDF) print job associated with a metadata file that defines contextual information for the PDF print job;
memory configured to store an action list that defines a sequence of steps for modifying the PDF print job; and
a job controller configured to initiate execution of the action list, to perform a step in the action list that causes a location shift of printable content in the PDF print job, to identify a parameter field in the metadata file that relates to the printable content affected by the location shift, and to automatically modify the parameter field in the metadata file based on the location shift to synchronize the metadata file with the PDF print job.

2. The system of claim 1 wherein:
the job controller is configured to modify the parameter field in the metadata file before execution of a subsequent step in the action list.

3. The system of claim 1 wherein:
the job controller is configured to modify the parameter field in the metadata file in response to execution of the step to apply the location shift to the printable content in the PDF print job.

4. The system of claim 1 wherein:
the job controller is configured to identify the parameter field by analyzing the metadata file for text that matches an instruction in the step.

5. The system of claim 1 wherein:
at least one step in the action list causes the location shift of the printable content by deleting content from the PDF print job.

6. The system of claim 1 wherein:
at least one step in the action list causes the location shift of the printable content by adding additional content to the PDF print job.

7. The system of claim 1 wherein:
the metadata file is a Job Definition Format (JDF) file that includes finishing instructions for pages of the PDF print job.

8. A method comprising:
receiving a Portable Document Format (PDF) print job associated with a metadata file that defines contextual information for the PDF print job;
storing an action list that defines a sequence of steps for modifying the PDF print job;
initiating execution of the action list;
performing a step in the action list that causes a location shift of printable content in the PDF print job;
identifying a parameter field in the metadata file that relates to the printable content affected by the location shift; and
automatically modifying the parameter field in the metadata file based on the location shift to synchronize the metadata file with the PDF print job.

9. The method of claim 8 further comprising:
modifying the parameter field in the metadata file before execution of a subsequent step in the action list.

10. The method of claim 8 further comprising:
modifying the parameter field in the metadata file in response to execution of the step to apply the location shift to the printable content in the PDF print job.

11. The method of claim 8 further comprising:
identifying the parameter field by analyzing the metadata file for text that matches an instruction in the step.

12. The method of claim 8 wherein:
at least one step in the action list causes the location shift of the printable content by deleting content from the PDF print job.

13. The method of claim 8 wherein:
at least one step in the action list causes the location shift of the printable content by adding additional content to the PDF print job.

14. A non-transitory computer readable medium embodying programmed instructions which, when executed by a processor, are operable for performing a method comprising:
receiving a Portable Document Format (PDF) print job associated with a metadata file that defines contextual information for the PDF print job;
storing an action list that defines a sequence of steps for modifying the PDF print job;
initiating execution of the action list;
performing a step in the action list that causes a location shift of printable content in the PDF print job;
identifying a parameter field in the metadata file that relates to the printable content affected by the location shift; and
automatically modifying the parameter field in the metadata file based on the location shift to synchronize the metadata file with the PDF print job.

15. The medium of claim 14, wherein the method further comprises:
modifying the parameter field in the metadata file before execution of a subsequent step in the action list.

16. The medium of claim 14, wherein the method further comprises:
modifying the parameter field in the metadata file in response to execution of the step to apply the location shift to the printable content in the PDF print job.

17. The medium of claim 14, wherein the method further comprises:
identifying the parameter field by analyzing the metadata file for text that matches an instruction in the step.

18. The medium of claim 14, wherein:
at least one step in the action list causes the location shift of the printable content by deleting content to the PDF print job.

19. The medium of claim 14, wherein:
at least one step in the action list causes the location shift of the printable content by adding additional content to the PDF print job.

20. The medium of claim 14, wherein:
the metadata file is a Job Definition Format (JDF) file that includes finishing instructions for pages of the PDF print job.

* * * * *